United States Patent
Cheng (10) Patent No.: US 7,657,606 B2
(45) Date of Patent: Feb. 2, 2010

(54) SELF-SUSTAINED ASIAN FONT SERVER AND SERVICE

(75) Inventor: Kuo-Young Cheng, Taichung Hsien (TW)

(73) Assignee: DynaComware Taiwan Inc., Taipei (TW)

( * ) Notice: Subject to any disclaimer, the term of this patent is extended or adjusted under 35 U.S.C. 154(b) by 538 days.

(21) Appl. No.: 11/389,368

(22) Filed: Mar. 24, 2006

(65) Prior Publication Data

US 2006/0164420 A1 Jul. 27, 2006

(30) Foreign Application Priority Data

Aug. 3, 2004 (JP) ............................. 2004-226682

(51) Int. Cl.
G06F 15/173 (2006.01)

(52) U.S. Cl. .................................................. 709/217

(58) Field of Classification Search .................. 709/217, 709/213; 345/619; 235/494; 382/181
See application file for complete search history.

(56) References Cited

U.S. PATENT DOCUMENTS

| | | | | |
|---|---|---|---|---|
| 5,852,448 A * | 12/1998 | Cheng | ......................... | 345/469 |
| 6,012,638 A * | 1/2000 | Ackley et al. | ........... | 235/462.01 |
| 6,024,289 A * | 2/2000 | Ackley | ......................... | 235/494 |
| 6,149,059 A * | 11/2000 | Ackley | ................... | 235/462.01 |
| 6,157,390 A * | 12/2000 | Cheng | ......................... | 345/467 |
| 6,186,406 B1 * | 2/2001 | Ackley | ......................... | 235/494 |
| 6,321,986 B1 * | 11/2001 | Ackley | ................... | 235/462.01 |
| 6,422,476 B1 * | 7/2002 | Ackley | ......................... | 235/494 |
| 6,501,475 B1 * | 12/2002 | Cheng | ......................... | 345/467 |
| 6,603,478 B1 | 8/2003 | Kuo et al. | | |
| 6,661,417 B1 * | 12/2003 | Cheng | ......................... | 345/469 |
| 6,741,749 B2 * | 5/2004 | Herbert, Jr. | ................. | 382/246 |
| 7,199,797 B2 * | 4/2007 | Cheng | ......................... | 345/470 |
| 7,263,658 B2 * | 8/2007 | Chou | ......................... | 715/262 |
| 7,302,099 B2 * | 11/2007 | Zhang et al. | ................. | 382/186 |
| 7,369,702 B2 * | 5/2008 | Abdulkader et al. | ........ | 382/187 |
| 7,464,000 B2 * | 12/2008 | Huang | ......................... | 702/183 |

* cited by examiner

*Primary Examiner*—David Y Eng
(74) *Attorney, Agent, or Firm*—Christensen O'Connor Johnson Kindness PLLC (57) ABSTRACT

A system for providing non-standard characters over a network is provided. The system includes: (a) a non-standard character server coupled to the network, (b) a character database coupled to the server, and (c) one or more client terminals coupled to the network. A user of each client terminal may create a non-standard character and send a non-standard character index issuance request for the created non-standard character to the non-standard character server. The non-standard character server receives the non-standard character index issuance request including an image of the non-standard character created by the client terminal, automatically assigns an index number to the received image of the non-standard character, stores the received image of the non-standard character and the index number assigned thereto in the character database, and sends the index number assigned to the received image of the non-standard character to all of the client terminals on the network.

18 Claims, 6 Drawing Sheets

SELF-SUSTAINED ASIAN FONT SERVER AND SERVICE

TECHNICAL FIELD

The present invention relates to the art of Asian character processing, and more particularly to a system and method for improving Asian character access on a personal computer via a network.

BACKGROUND

Each Asian font is a collection of characters, representing words or concepts, which include brush strokes and glyphs designed in a particular style. An entire set of Asian characters in a particular font requires a large amount of disk storage space since a single Asian font, unlike Roman-based languages, may contain more than 13,000 characters. Since most personal computers do not have sufficient storage space to store all Asian characters of a particular font, only a portion of the Asian font data (i.e., Asian characters) is stored, and the remaining portion of the Asian font data must be stored on an alternative or auxiliary storage device that is coupled via a network. Further, some rarely used Asian characters may be not stored even on an alternative or auxiliary storage device, and therefore may need to be constructed by the user of a personal computer. To this end, a user may employ any suitable character construction software tool, such as a graphics program that allows a user to graphically edit existing characters to appear as desired. One example of a character construction software tool is disclosed in U.S. Pat. No. 5,852,448, which is incorporated herein by reference.

U.S. Pat. No. 6,603,478, also incorporated herein by reference, describes a system and method that permit the user of a personal computer on a network to access characters stored in a remote database via a server. The system and method further permit the user of a personal computer to construct new characters if a desired character cannot be found in the memory of the personal computer or in the remote database.

When a new character is created in a personal computer, however, another personal computer that receives a document containing the newly created character may not recognize the newly created character for the purpose of proper display. Specifically, display of an Asian font on a computer screen is based on the use of a specific character code, typically an alpha-numeric code, assigned to each character within the font. Examples of character code systems include JIS code, Shift JIS code, Unicode, and ECU code. User activation of a computer input device (e.g., a particular sequence of selected keys on a keyboard) generates a character code that corresponds to a certain character. Thus, by entering a character code using the input device, the user can access and retrieve the corresponding character from the memory of the personal computer or in any alternative or auxiliary memory, and display it on a computer screen. Also, when a personal computer receives a document including Asian characters, as long as the character codes for those characters are registered in the personal computer, the personal computer can properly display the characters.

All standard characters are defined in terms of character codes in any of the exemplary character code systems (JIS, Shift JIS, etc.) and thus many computers, in which these character code systems are registered, can readily share (process or display) these standard characters. When the user of a personal computer constructs a new character, however, the personal computer may assign a new character code to the newly created character and, therefore, the new character code is not readily shared with any other computers. When those computers in which the newly created character is not registered receive a document containing the newly created character, the computers cannot properly display the newly created character.

A need exists for a system and method for centrally managing all new characters created by various user systems (e.g., personal computers) on a network, so as to permit all user systems to readily share the newly created characters.

SUMMARY

This summary is provided to introduce a selection of concepts in a simplified form that are further described below in the Detailed Description. This summary is not intended to identify key target features of the claimed subject matter, nor is it intended to be used as an aid in determining the scope of the claimed subject matter.

In accordance with one embodiment, the present invention offers a system for providing non-standard characters over a network. As used herein, a non-standard character means a character that is slightly modified from a "standard" character registered in any of the exemplary character code systems (JIS, Shift JIS, etc.). The system includes generally three elements: (a) a non-standard character server coupled to the network, (b) a character database coupled to the non-standard character server, and (c) one or more client terminals (or user systems) coupled to the network. A user of each client terminal may create a non-standard character, using a suitable character construction graphics tool, and send a non-standard character index issuance request for the created non-standard character over the network to the non-standard character server. Essentially, the non-standard character index issuance request prompts the non-standard character server to issue a unique index number for the newly created non-standard character and to further transmit the unique index number to all client terminals coupled to the network so that all client terminals can recognize and display the newly created character.

In various exemplary embodiments of the present invention, the non-standard character server includes three modules: a client management module, a character database management module, and a non-standard character assignment module. The client management module is configured to receive a non-standard character index issuance request including an image of a non-standard character created by a client terminal, and to automatically assign an index number to the received image of a non-standard character. The character database management module is configured to store the received image of a non-standard character and the index number assigned thereto in the character database. The non-standard character assignment module is configured to send the index number assigned to the received image of a non-standard character to each of the one or more client terminals connected to the network.

In accordance with one aspect of the present invention, a non-standard character index issuance request includes a standard character code corresponding to the non-standard character created by a client terminal. Specifically, because any non-standard character is a slight modification of a standard character, each non-standard character may be associated with its corresponding standard character's code. Then, the database management module of the non-standard character server may be configured to search for one or more non-standard characters already stored in the character database that also have the same standard character code. When such non-standard characters are located, the client management module of the non-standard character server may recall a neural network with weight coefficients, which may be predefined (pre-trained) to uniquely identify a unique index number for each of the located non-standard characters based on their respective moment values.

The client management module may further calculate moment values for the newly created non-standard character image received from a client terminal, and enter the calculated moment values to the neural network. If the output from the neural network matches any of the index numbers assigned to the non-standard characters already stored in the character database, then it is determined that the newly created non-standard character is the same as the pre-stored non-standard character having the same index number. Thus, the index number for the pre-stored non-standard character is returned to the client terminal that has sent the non-standard character index issuance request for the newly created non-standard character. If, on the other hand, the output from the neural network differs from any of the index numbers assigned to the pre-stored non-standard characters, the neural network is further trained to identify a unique index number for the newly created non-standard character, and the newly identified index number is sent to the client terminal.

In accordance with various other embodiments, the present invention further offers a method for providing non-standard characters over a network. The network includes a non-standard character server, a character database, and one or more client terminals. The method provides non-standard characters from the non-standard character server to each of the one or more client terminals, and includes generally five steps. First, one of the client terminals creates and sends an image of a non-standard character and a non-standard character index issuance request to the server. Second, the server receives the non-standard character index issuance request and the image of the non-standard character from the client terminal. Third, the server determines whether the non-standard character received from the client terminal is already registered in the character database. Fourth, if it is determined that the non-standard character is not registered in the character database, the server assigns a new index number to the received non-standard character and stores the image of the received non-standard character with its newly assigned index number in the character database. Fifth, the server sends the index number assigned to the received non-standard character to each of the client terminals connected to the network.

In accordance with one aspect of the invention, the third step of determining whether the non-standard character received from the client terminal is already registered in the character database further includes the following four sub-steps. First, it is verified whether the non-standard character index issuance request is valid. For example, this can be achieved by verifying whether the non-standard character index issuance request includes a standard character code corresponding to the image of the non-standard character. Second, moment values are calculated for the image of the non-standard character received from the client terminal. Third, an index number is determined for the image of the non-standard character received from the client terminal based on the calculated moment value, for example, by plugging the calculated moment values into a neural network. Fourth, the character database is searched for any non-standard character already registered therein that has the same index number. If any non-standard character having the same index number is found in the character database, it is determined that the non-standard character received from the client terminal is the same as the already registered non-standard character having the same index number.

In accordance with another aspect of the invention, the method's fourth step of assigning a new index number to the received non-standard character involves the use of a neural network, and further involves training the neural network so that input of the moment values calculated for the image of the non-standard character will produce a unique index number to be assigned to the non-standard character.

In accordance with further embodiments of the present invention, a computer-readable tangible medium comprising computer executable instructions is provided for performing various methods of the present invention, as described above.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present invention is directed to providing a system, method, and computer-readable medium, including computer-executable instructions for making non-standard characters readily accessible by various user systems or client terminals (e.g., personal computers) connected via a network. Specifically, each time a client terminal constructs a non-standard character, the constructed character image is sent via the network to a non-standard character server. The server then assigns a unique index number to the received character image and further transmits the assigned index number to all client terminals connected via the network to automatically update the non-standard character file in each client terminal. If the constructed character image received from a client terminal is already registered in a character database connected to the server, the server transmits the index number already assigned to the character to the client terminal to update the client terminal's non-standard character file.

Figure 1:
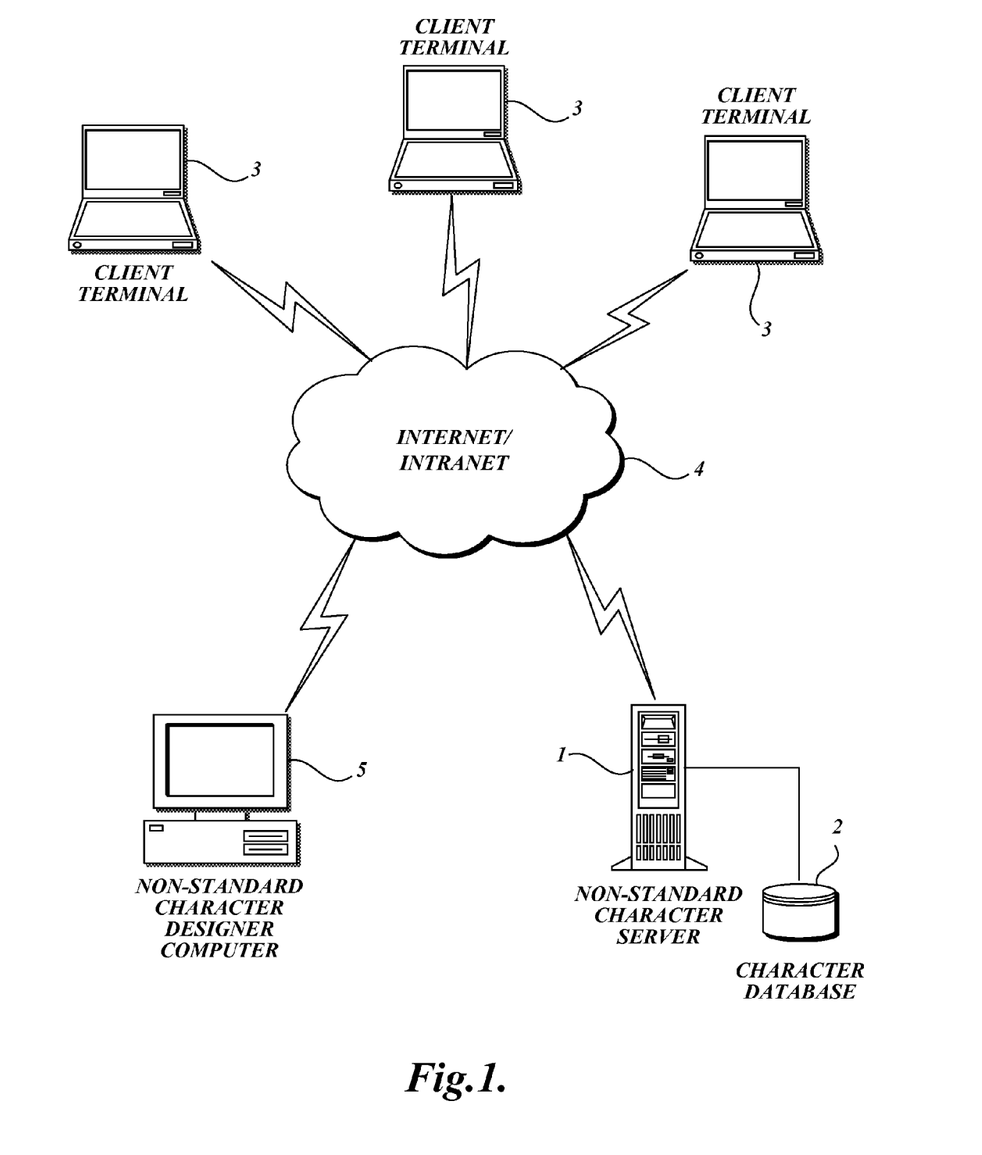
FIG. 1 is a diagram illustrating a non-standard character provider system utilizing a network, formed in accordance with one embodiment of the present invention.

FIG. 1 illustrates an exemplary system usable for practicing various embodiments of the present invention. The system includes a non-standard character server 1 and a character database 2 coupled thereto, and one or more client terminals 3 coupled to the non-standard character server 1 via a public or private data network 4, such as the Internet or an intranet. As illustrated, the system may further include a computer 5 of a non-standard character designer, also connected to the network 4. The non-standard character designer may generate an image of a non-standard character upon request from the non-standard character server 1, as will be more fully described below.

Figure 2:
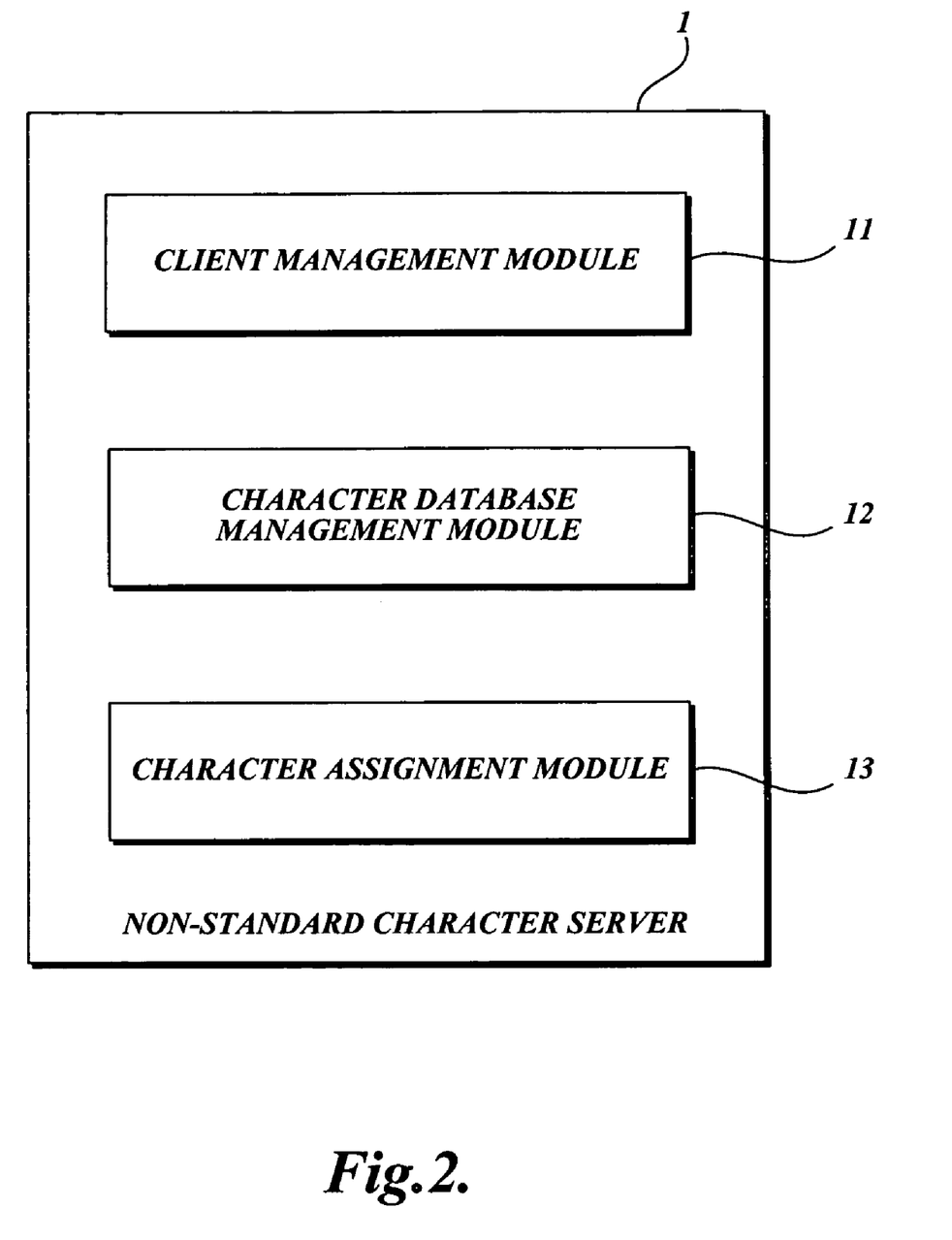
FIG. 2 is a functional diagram of a non-standard character server for use in various exemplary embodiments of the present invention.

FIG. 2 is a functional system diagram of the non-standard character server 1 in accordance with one embodiment of the present invention, including a client management module 11, a character database management module 12, and a character assignment module 13.

Generally, the client management module 11 is configured to receive a non-standard character index issuance request from any of the client terminals 3, to assign a unique index number to the received non-standard character, and to send the received non-standard character together with its assigned index number to the character database 2. The client management module 11 may be further configured such that, if the received non-standard character image has no similar images stored in the character database 2 (i.e., when the character database 2 does not include any non-standard characters associated with the same standard character code as the received non-standard image), the client management module 11 sends a request to a non-standard character designer at the computer 5 to recreate or redesign an image of the non-standard character based on the image of the non-standard character received from the client terminal 3. To that end, the client management module 11 transmits the image of the non-standard character received from the client terminal 3 together with its standard character code to the computer 5 of the non-standard character designer, and receives the recreated or redesigned non-standard character image from the computer 5.

Thereafter, the client management module 11 processes the recreated or redesigned non-standard character received from the computer 5 in the same manner as it processes the non-standard character received from a client terminal 3. For the purpose of assigning an index number to a non-standard character, which is associated with a certain standard character code, the client management module 11 is configured to access a set of non-standard characters in the character database corresponding to the same standard character code. The client management module 11 may further recall a neural network with weight coefficients, which is pre-trained to output a unique index number for each of the set of non-standard characters based on their respective moment values, and then train the neural network to additionally identify a unique index number for the newly created non-standard character.

The character database management module 12 stores non-standard characters with their respective index numbers in the character database 2, and also searches the character database 2 for non-standard characters based on, for example, their index numbers, corresponding standard character codes, etc.

The character assignment module 13 is configured to collect desired non-standard character data (e.g., index numbers for newly created non-standard characters) from the character database 2, and to send the non-standard character data to each client terminal 3 to thereby update the client terminal's non-standard character file (e.g., by replacing any previous non-standard character file in a client terminal with the new file).

Figure 3:
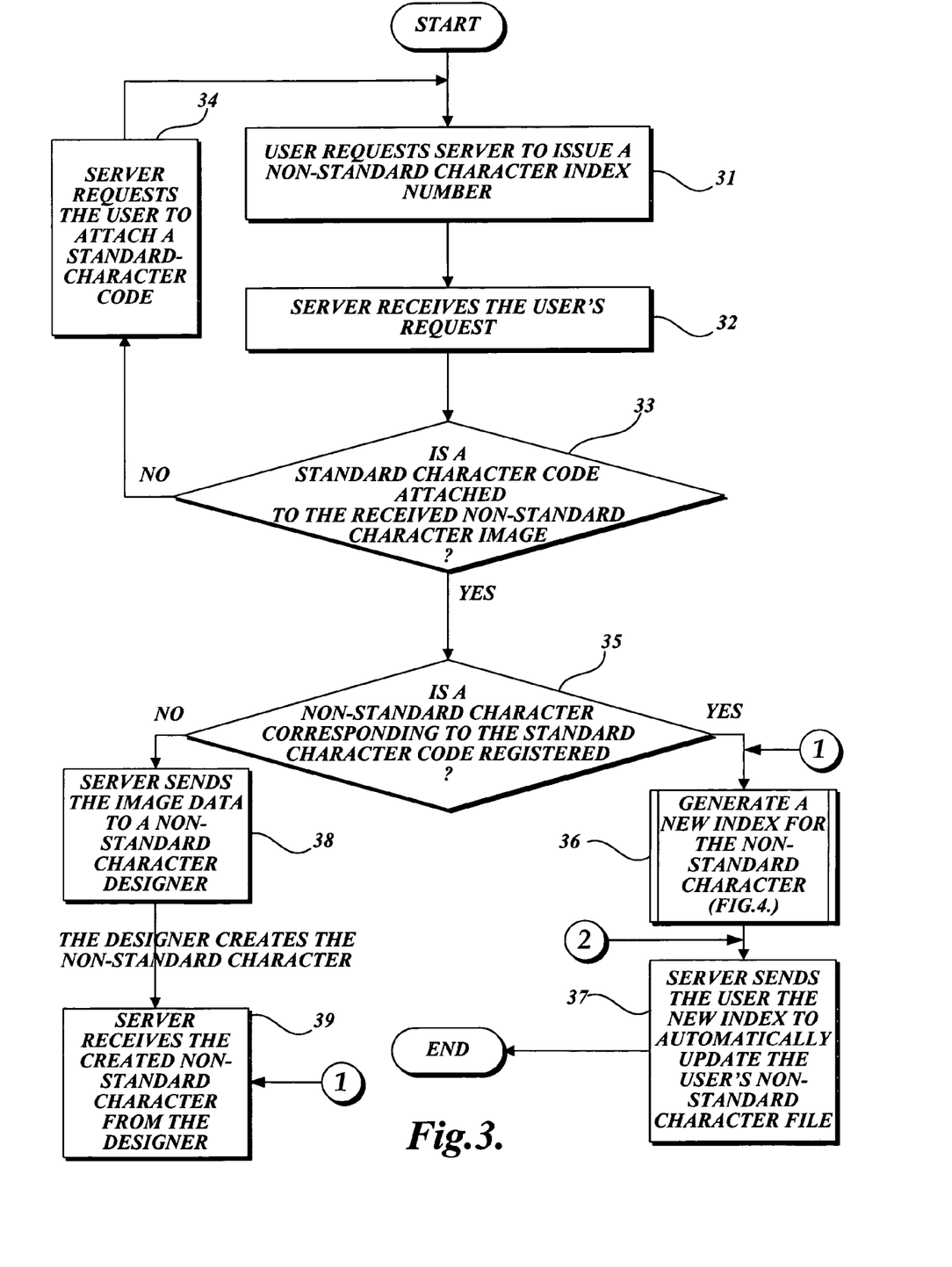
FIG. 3 is a flowchart illustrating the process to be performed by a non-standard character provider system utilizing a network, in accordance with one embodiment of the present invention.

FIG. 3 is a flowchart illustrating the steps to be performed by a non-standard character provider system in accordance with various exemplary embodiments of the present invention. At step 31, a client terminal 3 (e.g., a personal computer, a user system) sends a non-standard character index issuance request together with a newly created image of a non-standard character to the non-standard character server 1.

FIGS. 7A-7F illustrates the concept of "non-standard" characters as used herein. Four "non-standard" characters 7B-7E are shown, which are all slightly modified from their corresponding "standard" character 7A (corresponding to Shift JIS code: 0xe7b2). Because non-standard characters 7B-7E are all based on the standard character 7A, they are assigned the same standard character code as the standard character 7A. Further, to distinguish these non-standard characters from each other (and also from the standard character 7A), each non-standard character is assigned a unique index number in addition to the standard character code.

The following describes a process of assigning a new index number to another non-standard character 7F, which is newly created by the user of one of the client terminals 3. As illustrated, the non-standard character 7F is also a slight modification of the standard character 7A, and is further slightly different from each of the other non-standard characters 7B-7E. The following description supposes that the user has sent a non-standard character index issuance request together with the image of the newly created non-standard character 7F to the non-standard character server 1.

At step 32, the server 1 receives the non-standard character index issuance request from the client terminal 3. At step 33, the client management module 11 of the server 1 determines whether the received non-standard image includes a standard character code attached thereto. If no standard character code is attached, then at step 34 the server 1 requests the client terminal 3 to attach a standard character code.

On the other hand, if a standard character code is attached, then at step 35 the client management module 11 uses the standard character code to search through the character database 2 to identify all non-standard characters having the same standard character code. In the present example, the non-standard characters 7B-7E have been registered in the character database 2 and therefore are identified. Then, proceeding to step 36, the client management module 11 assigns a new index number to the newly created non-standard character 7F.

Figure 4:
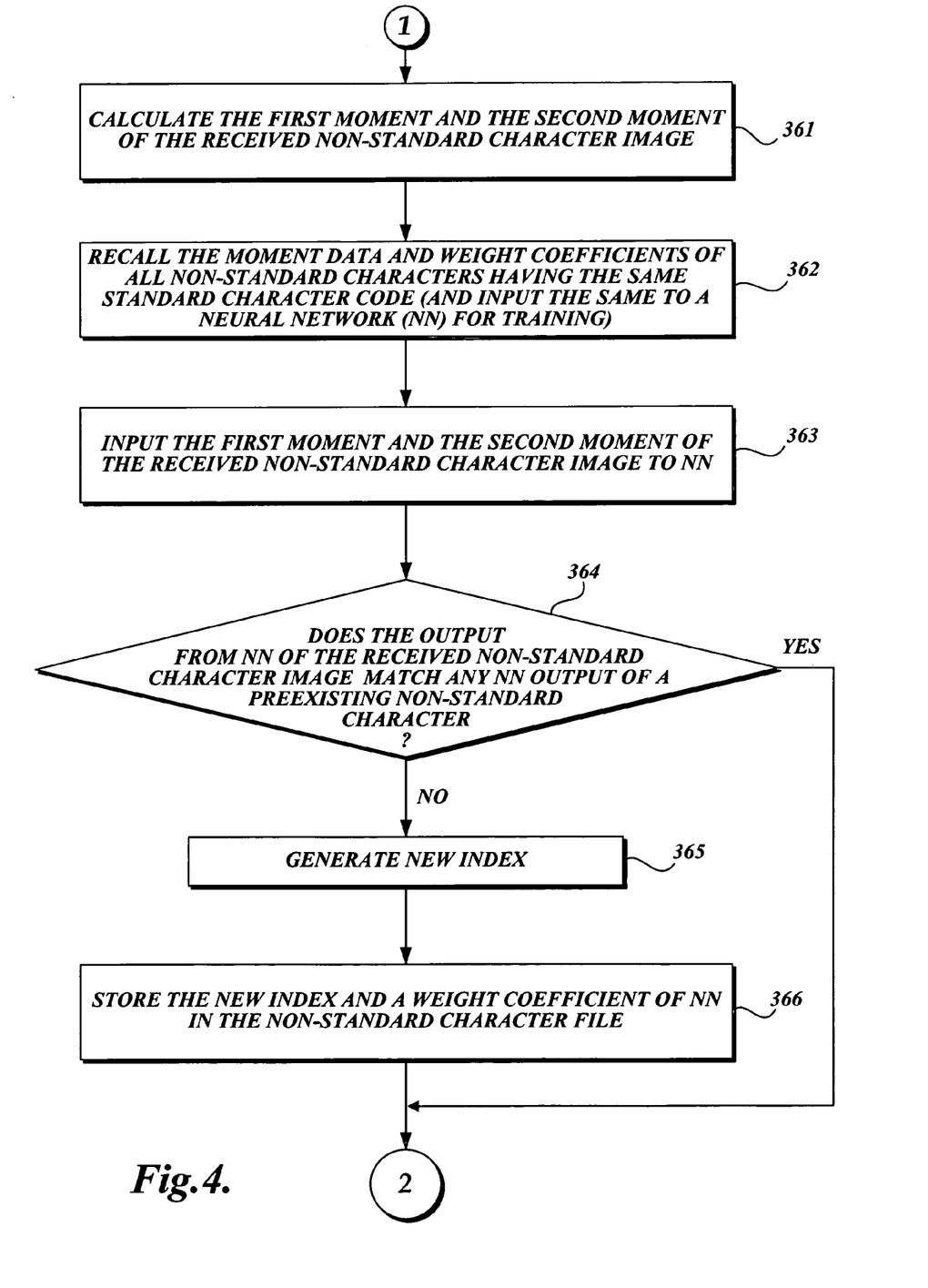
FIG. 4 is a flowchart illustrating step 36 of FIG. 3 in detail.
Figure 7A:
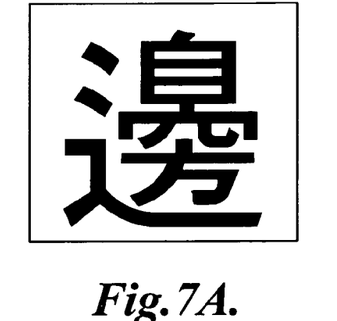
FIGS. 7A-7F illustrates a "standard" character and various non-standard characters corresponding to the "standard" character.
Figure 7B:
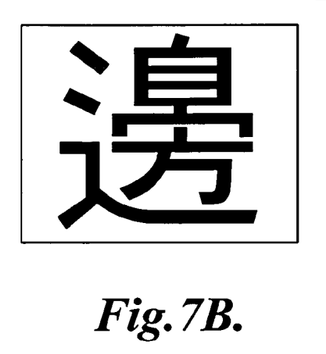
Figure 7C:
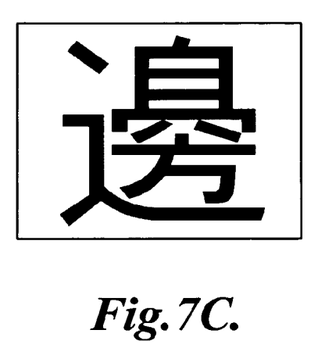
Figure 7D:
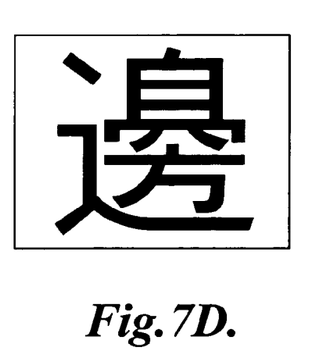
Figure 7E:
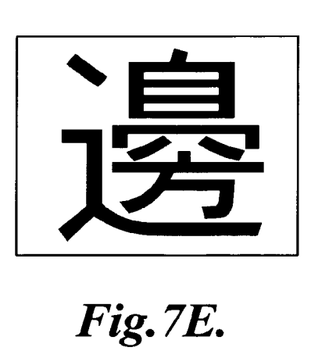
Figure 7F:
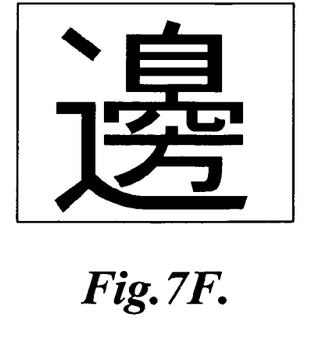

FIG. 4 illustrates the process of assigning an index number to a newly created non-standard character (the non-standard character 7F in the present example), corresponding to step 36 of FIG. 3. In FIG. 4, at step 361, the first and second moment values for the received image of the non-standard character 7F are calculated. As used herein, the first and second "moment values" refer to the values derived from the following equations (1) and (2), respectively, and specifically, the first moment values comprise $m_x$ and $m_y$, and the second moment values comprise $\sigma_x$ and $\sigma_y$.

$$m_x = \frac{1}{n}\sum_{i=1}^{n}(x_i - x_0), \; m_y = \frac{1}{n}\sum_{i=1}^{n}(y_i - y_0) \quad \text{(Eq. 1)}$$

$$\sigma_x = \frac{1}{n}\sum_{i=1}^{n}(x_i - x_0)^2, \; \sigma_y = \frac{1}{n}\sum_{i=1}^{n}(y_i - y_0)^2 \quad \text{(Eq. 2)}$$

Figure 6:
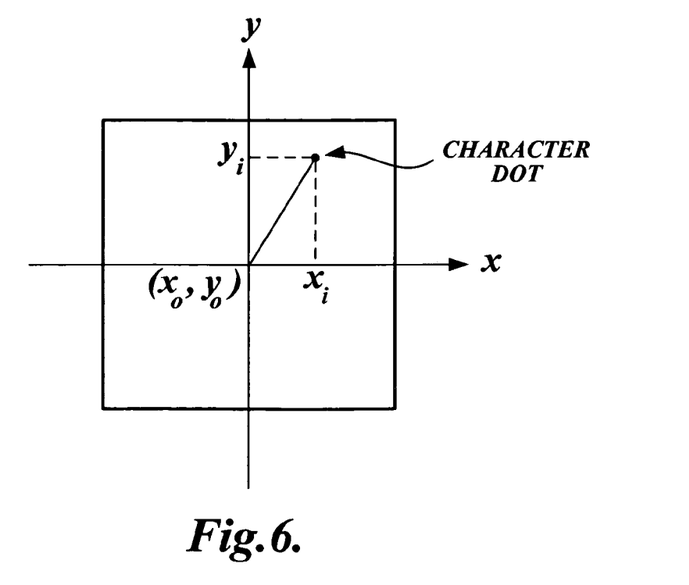
FIG. 6 illustrates the concept of moment value calculation as used in various exemplary embodiments of the present invention.

Referring additionally to FIG. 6, equations (1) and (2) above are based on the coordinates $(x_i, y_i)$ of each pixel forming a non-standard character image, where the origin is $(x_0, y_0)$ that lies at the center of a square nominally enclosing the non-standard character image.

For the purpose of illustration, the first and second moment values calculated for each of the standard character 7A and the five non-standard characters 7B-7F (as shown in FIGS. 7A-7F), are set forth in Table 1 below.

TABLE 1

| | 7A (Standard Character) | 7B | 7C | 7D | 7E | 7F |
|---|---|---|---|---|---|---|
| $m_x$ | −5.21 | −2.33 | −4.73 | −4.55 | −3.63 | −4.85 |
| $m_y$ | 3.64 | 5.82 | 7.59 | 7.54 | 8.17 | 8.51 |
| $\sigma_x$ | 4380.47 | 4264.5 | 4275.91 | 4272.63 | 4034.44 | 4150.04 |
| $\sigma_y$ | 3658.6 | 3578.8 | 3469.31 | 3442.13 | 3480.21 | 3470.92 |

Next, at step 362, the first and second moment values already stored in the character database 2 for the non-standard characters 7B through 7E, and neural network weight coefficients also stored in a suitable database (which may be the same as the character database 2) are recalled. Alternatively, the first and second moment values for the non-standard characters 7B through 7E may be recalled and used to train the neural network to thereby determine suitable weight coefficients that uniquely identify an index number for each of the non-standard characters 7B through 7E.

Figure 5:
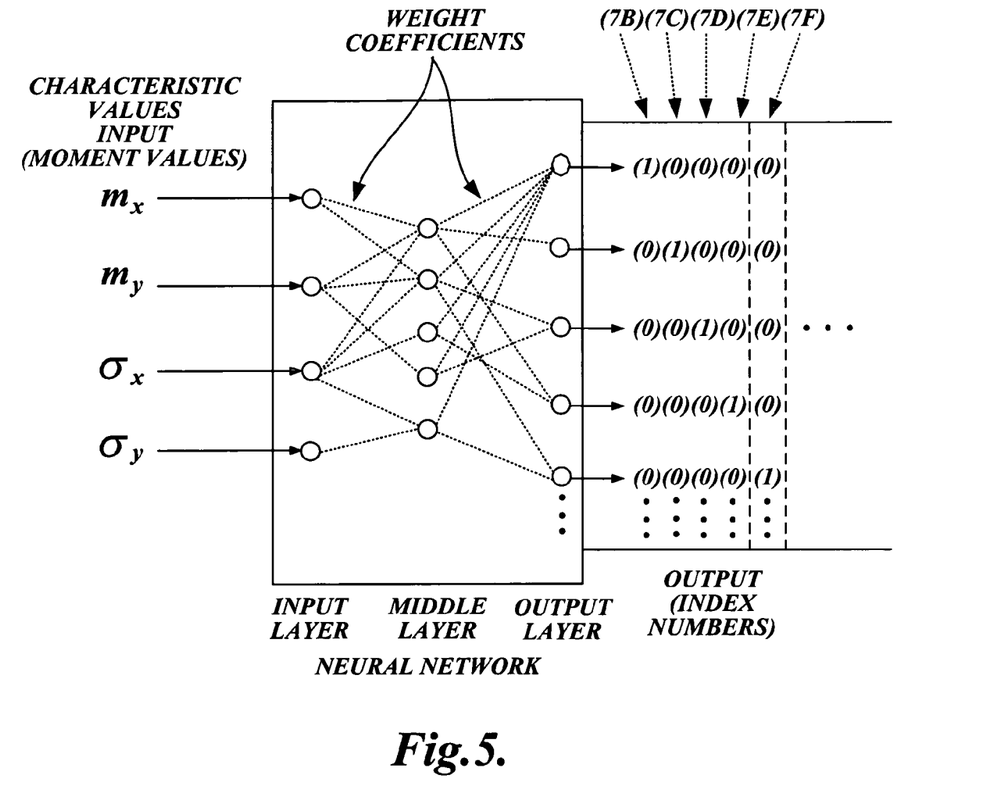
FIG. 5 schematically illustrates the operation and function of a neural network.

FIG. 5 schematically illustrates a neural network, which mainly consists of an input layer, a middle layer, an output layer, and weight coefficients provided between the input and output layers, as well known in the art. Briefly, moment values entered into the input layer are adjusted (strengthened or weakened) based on the weight coefficient of the first layer and are transmitted to the middle layer. From the middle layer the data are further adjusted (strengthened or weakened) based on the weight coefficient of the second layer and are transmitted to the output layer. If appropriate weight coefficients have been applied, the output value will be able to identify a particular non-standard character corresponding to the moment value data that have been entered into the neural network. The process of determining appropriate weight coefficients for achieving the desired result (i.e., for producing the desired output) is called training the neural network.

For example, upon successful training of the network, when the moment value data for the non-standard character 7B are input to the neural network, the output for the first row becomes "1" while the output for each of the other rows becomes "0", as shown in FIG. 5. Likewise, input of the moment value data for the non-standard character 7C will output "1" in the second row only, input of the moment value data for the non-standard character 7D will output "1" in the third row only, and input of the moment value data for the non-standard character 7E will output "1" in the fourth row only. Such output from the neural network can be used as index numbers for the non-standard characters 7B-7E, respectively. Specifically, the index numbers for the non-standard characters 7B-7E can be 10000, 01000, 00100, and 00010, respectively.

At step 363, the moment value data (e.g., the first and second moment values) calculated for the non-standard character 7F received from the client terminal 3 are input to the neural network. At step 364, it is determined if the output from the neural network corresponds to any of the index numbers for the non-standard characters 7B-7E stored in the database 2. If so, it is determined that the non-standard character 7F is already registered in the database 2 and the process advances to step 37 of FIG. 3, where the index number of the already registered non-standard character, whose neural network output matched the output of the non-standard character 7F, is sent to the client terminal 3 to update the client terminal's non-standard character file.

In the illustrated example, the non-standard character 7F does not match any of the pre-registered non-standard characters 7B-7E, and therefore, proceeding to step 365, the neural network is trained to identify a new index number to be assigned to the non-standard character 7F. For example, the neural network may be trained to identify weight coefficients that will cause the network to output "1" in the fifth row only, to thereby uniquely identify the non-standard character 7F when its moment value data are input-into the neural network. Then, a new index number (e.g., 00001) is identified and assigned to the newly created non-standard character 7F. At step 366, the image of the non-standard character 7F, its newly assigned index number, and also the weight coefficients used by the neural network to uniquely identify the character 7F based on its moment value data, are packaged together into a file and stored in the character database 2.

Proceeding to step 37 of FIG. 3, after a new index number is assigned to the newly created non-standard character 7F as requested by the client terminal 3, the character assignment module 13 of the server 1 transmits an updated non-standard character file including the index numbers of all registered non-standard characters 7B through 7F to every client terminal 3 on the network 4. Then, the old non-standard character file in each client terminal 3 is replaced (or updated) with the newly received non-standard character file. It should be noted that the updated non-standard character file is sent not only to the client terminal that initially sent the non-standard character index issuance request but also to all other client terminals connected to the network 4, to thereby update their respective non-standard character files. This will ensure that any client terminal connected to the network 4 will be able to process and display a document containing those non-standard characters that may have been created by any other client terminals on the network.

While the above description is directed to a case where some non-standard characters corresponding to the same standard character code as the newly created non-standard character are already registered in the character database 2, there may be a situation where there is no such non-standard character. Specifically, if at step 35 in FIG. 3 it is determined that there is not a single non-standard character corresponding to the indicated standard character code, at step 38, the client management module 11 of the server 1 sends the image of the newly created non-standard character as received form the client terminal 3 to the computer 5 of a (professional) character designer. Thereafter, at step 39, the client management module 11 receives the image of the recreated or redesigned non-standard character from the computer 5, and proceeding to step 36, assigns an index number to the image of the recreated or redesigned non-standard character as received from the computer 5.

As described above, the present invention permits a user of each client terminal connected to a network to create a non-standard character and send it to a non-standard character server, which then automatically generates and assigns a unique index number to the received non-standard character. The server further sends the newly assigned index number to all client terminals connected to the network to thereby update the non-standard character file in each of the client terminals. Therefore, as more non-standard characters are created by any one of the client terminals on the network, these non-standard characters become readily accessible and displayable by all of the client terminals connected to the network.

While the preferred embodiments of the invention have been illustrated and described, numerous variations in the illustrated and described arrangements of systems, components, and sequences of operations will be apparent to one skilled in the art based on this disclosure. Various aspects of The embodiments of the invention in which an exclusive property or privilege is claimed are defined as follows:

1. A system for providing non-standard characters over a network comprising:
   (a) a non-standard character server coupled to the network;
   (b) a character database coupled to the server, wherein multiple sets of non-standard characters are stored in association with their corresponding standard character codes, respectively; and
   (c) one or more client terminals coupled to the network, each client terminal being configured to create a non-standard character and send a non-standard character index issuance request for the created non-standard character over the network to the non-standard character server;
   wherein the non-standard character server comprises:
      (i) a client management module that is configured to receive a non-standard character index issuance request including an image of a non-standard character created by a client terminal, and to automatically assign an index number to the received image of a non-standard character;
      (ii) a character database management module that is configured to store the received image of a non-standard character and the index number assigned thereto in the character database; and
      (iii) a non-standard character assignment module that is configured to send the index number assigned to the received image of a non-standard character to each of the one or more client terminals.

2. The system of claim 1, wherein the client management module is further configured to send the image of a non-standard character received from the client terminal to a computer of a character designer, and to receive non-standard character image data created by the character designer therefrom.

3. The system of claim 1, wherein the non-standard character index issuance request comprises a standard character code corresponding to the non-standard character created by the client terminal, the database management module is further configured to search for a set of one or more non-standard characters corresponding to the received standard character code in the character database, and the client management module is further configured to calculate moment values for each of the set of one or more non-standard characters corresponding to the received standard character code for training a neural network to identify an index number for each of the set of one or more non-standard characters.

4. The system of claim 3, wherein the client management module is configured to calculate moment values for the image of the non-standard character created by the client terminal, and to further train the neural network to identify a unique index number for the image of the non-standard character created by the client terminal.

5. The system of claim 3, wherein the moment values for each of the set of one or more non-standard characters consist of first and second moment values.

6. The system of claim 1, wherein the database management module is further configured to search non-standard characters in the character database based on an index number.

7. A method for providing non-standard characters over a network, the network comprising a non-standard character server, a character database, and one or more client terminals, wherein the method provides non-standard characters from the non-standard character server to each of the one or more client terminals, the method comprising the steps of:
   (a) one of the one or more client terminals creating and sending an image of a non-standard character and a non-standard character index issuance request to the server;
   (b) the server receiving the non-standard character index issuance request and the image of the non-standard character from the client terminal;
   (c) the server determining whether the non-standard character received from the client terminal is already registered in the character database;
   (d) if it is determined that the non-standard character is not registered in the character database in step (c) above, the server assigning a new index number to the received non-standard character and storing the image of the received non-standard character with its newly assigned index number in the character database; and
   (e) the server sending the newly assigned index number to each of the one or more client terminals.

8. The method of claim 7, wherein step (c) further comprises the sub-steps of:
   (i) verifying whether the non-standard character index issuance request is valid;
   (ii) calculating first and second moment values for the image of the non-standard character received from the client terminal;
   (iii) determining an index number for the image of the non-standard character received from the client terminal based on the first and second moment values calculated in sub-step (ii) above; and
   (iv) searching for any non-standard character registered in the character database based on the index number determined in sub-step (iii) above.

9. The method of claim 8, wherein sub-step (c)(i) comprises verifying whether the non-standard character index issuance request includes a standard character code corresponding to the image of the non-standard character.

10. The method of claim 8, wherein sub-step (c)(iii) comprises determining an index number by inputting the first and second moment values into a neural network, whereby the neural network determines the index number.

11. The method of claim 8, wherein step (d) comprises the use of a neural network, and further comprises training the neural network so that input of the first and second moment values for the image of the non-standard character as calculated in sub-step (c)(ii) will produce a unique index number to be assigned to the received non-standard character.

12. The method of claim 7, wherein step (d) further comprises storing in the character database all non-standard characters corresponding to one standard character code in association with each other.

13. A computer-readable storage medium comprising computer executable instructions which, when loaded onto a non-standard character server coupled with a character database and one or more client terminals via a network, cause the non-standard character server to perform the steps of:
   (a) receiving a non-standard character index issuance request and an image of a non-standard character created by one of the one or more client terminals from that client terminal;
   (b) determining whether the non-standard character received from the client terminal is registered in the character database;

(c) if it is determined that the non-standard character is not registered in the character database in step (b) above, assigning a new index number to the received non-standard character and storing the image of the received non-standard character with its newly assigned index number in the character database; and (d) sending the newly assigned index number to each of the one or more client terminals.

14. The computer-readable storage medium of claim 13, wherein the computer executable instructions cause the non-standard character server to perform the further sub-steps in step (b) of:
  (i) verifying whether the non-standard character index issuance request is valid;
  (ii) calculating first and second moment values for the image of the non-standard character received from the client terminal;
  (iii) determining an index number for the image of the non-standard character received from the client terminal based on the first and second moment values calculated in sub-step (ii) above; and
  (iv) searching for any non-standard character registered in the character database based on the index number determined in sub-step (iii) above.

15. The computer-readable storage medium of claim 14, wherein sub-step (b)(i) comprises verifying whether the non-standard character index issuance request includes a standard character code corresponding to the image of the non-standard character.

16. The computer-readable storage medium of claim 14, wherein sub-step (b)(iii) comprises determining an index number by inputting the first and second moment values into a neural network, whereby the neural network determines the index number.

17. The computer-readable storage medium of claim 14, wherein step (c) comprises the use of a neural network, and further comprises training the neural network so that input of the first and second moment values for the image of the non-standard character as calculated in sub-step (b)(ii) will produce a unique index number to be assigned to the received non-standard character.

18. The computer-readable storage medium of claim 13, wherein step (c) further comprises storing in the character database all non-standard characters corresponding to one standard character code in association with each other.

* * * * *